United States Patent [19]
Essers et al.

[11] 3,818,175
[45] June 18, 1974

[54] WELDING TORCH

[75] Inventors: Wilhelmus Gerardus Essers; Gerardus Jelmorini, both of Emmasingel, Eindhoven, Netherlands

[73] Assignee: U.S. Philips Corporation, New York, N.Y.

[22] Filed: Dec. 1, 1972

[21] Appl. No.: 311,418

[30] Foreign Application Priority Data
Dec. 15, 1971  Netherlands........................ 7117169

[52] U.S. Cl.............................. 219/121 P, 219/130
[51] Int. Cl............................................... B23k 9/00
[58] Field of Search........... 219/130, 136, 74, 121 P

[56] References Cited
UNITED STATES PATENTS

| | | | |
|---|---|---|---|
| 2,289,938 | 7/1942 | Smith................................. | 219/136 |
| 3,265,856 | 8/1966 | Cecil.................................. | 219/130 |
| 3,312,566 | 4/1967 | Winzeler et al. ............ | 219/121 P X |
| 3,469,070 | 9/1969 | Bernard et al...................... | 219/130 |
| 3,470,349 | 9/1969 | Sievers............................... | 219/136 |
| 3,576,423 | 4/1971 | Bernard et al.................. | 219/130 X |
| 3,604,889 | 9/1971 | Rohrberg......................... | 219/121 P |
| 3,612,807 | 10/1971 | Liefkens et al................. | 219/121 P |
| 3,649,805 | 3/1972 | Rohrberg......................... | 219/121 P |
| 3,690,567 | 9/1972 | Borneman...................... | 219/121 P |

*Primary Examiner*—J. V. Truhe
*Assistant Examiner*—Hugh D. Jaeger
*Attorney, Agent, or Firm*—Frank R. Trifari

[57] ABSTRACT

A welding torch comprising a housing having accommodated therein a contact tube through which welding wire is guided and through which is transmitted current to the wire; the electrode tip part of the contact tube is manufactured from a metal such as tungsten having a high melting point and a high resistance to detrition.

4 Claims, 1 Drawing Figure

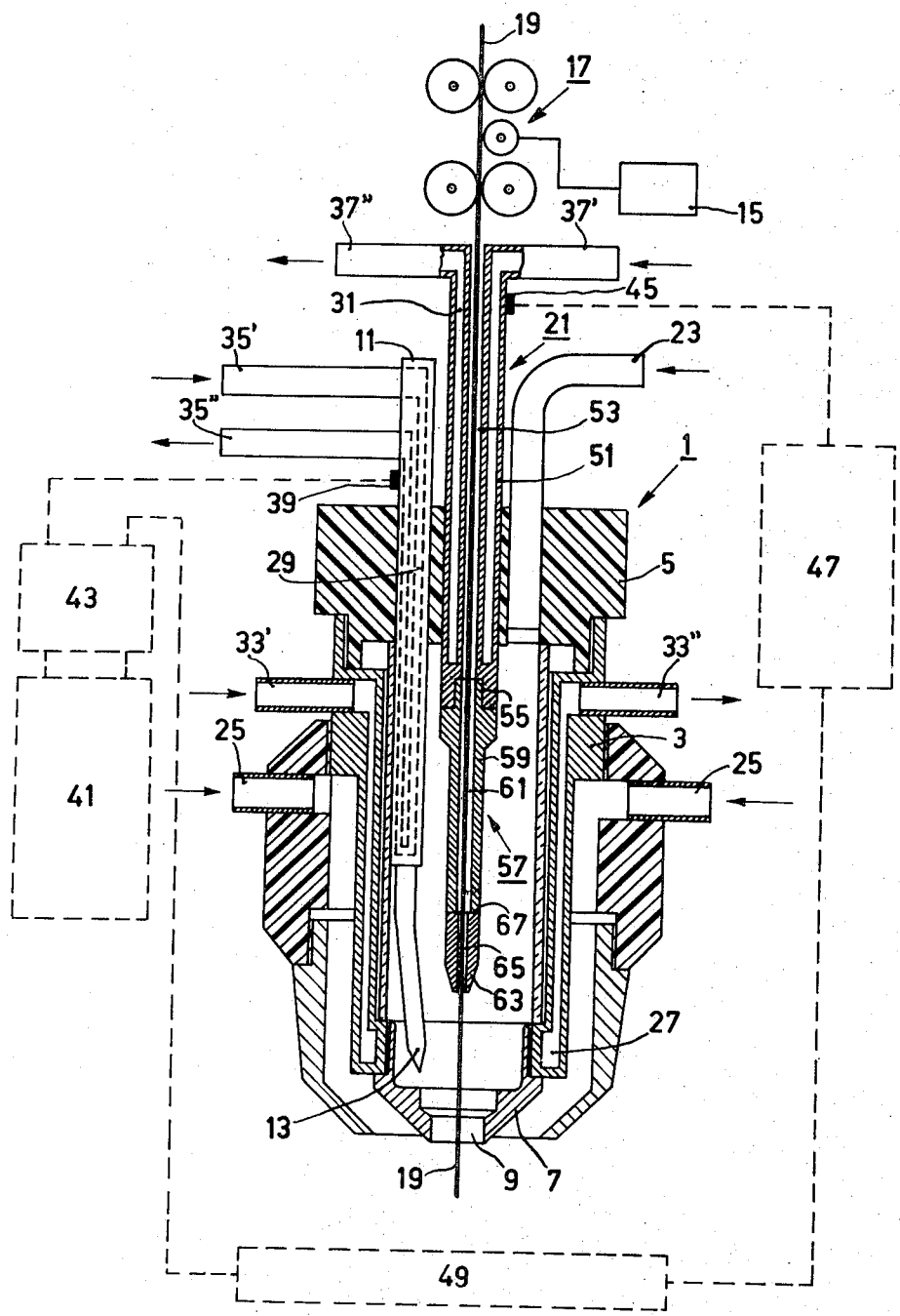

WELDING TORCH

The invention relates to a welding torch comprising a housing having accommodated therein a metal contact tube provided with a bore for guiding and transmitting current to a welding wire to be supplied, said welding torch furthermore comprising means for connecting the contact tube to a current source.

Welding torches for carrying out the conventional gas arc welding processes are provided with a contact tube having a rather wide bore through which the welding wire, which is unwound from a reel and straightened, is fed by means of transport rollers. The contact tube is usually manufactured from copper or a copper alloy. By means of the contact tube the current from a current source is transmitted to the welding wire which serves as an electrode. The current transmission takes place in that the welding wire, which is not perfectly straight and still slightly curved, contacts the tube in the bore thereof on one or several places. However, if the welding wire is supplied perfectly straightened and without curvature, as required, for example, in plasma-MIG-welding, spark formation occurs between the welding wire and the contact tube as a result of which the latter is damaged due to overheating, the passage of the welding wire being impeded; as a result of the larger resistance and friction, the driving rollers start slipping over the welding wire damaging the latter; scrapings of the welding wire can enter the bore of the contact tube as a result of which the tube is further damaged; finally the welding wire is fully jammed in the bore of the contact tube and the welding process has to be interrupted. These difficulties occur in particular when using welding wire of stainless steel.

In order to ensure an uninterrupted current transmission to the welding wire, a known welding torch of the type mentioned in the preamble comprises a contact tube having resilient lugs at the free end, which lugs contact the welding wire continuously; since the lugs are resiliently pressed against the welding wire and a view of the low resistance to detrition of copper of which the contact tube is manufactured, said tube is subject to high detrition in particular at high feeding rates of the wire.

It is the object of the invention to provide a welding torch which does not exhibit these drawbacks and with which an accurately straightened welding wire supplied at high speed can be handled without disturbances and with a very restricted wear of the contact tube.

SUMMARY OF THE INVENTION

According to the invention this object is mainly achieved in that the contact tube is at least partly made from a metal having a high melting-point and a high resistance to detrition i.e., wearing away as erosion.

In view of the high melting-point of the metal from which the contact tube is manufactured, sparks between the welding wire and the tube do not result in damage of the latter. In contrast with a copper contact tube, scrapings which nevertheless enter the tube are passed through without damaging it in view of the high resistance to detrition of the tube.

In a preferred embodiment of the welding torch according to the invention, the contact tube is manufactured at least mainly from tungsten. Materials which have the required properties and which are to be considered for the application in addition to tungsten are well as porous sintered and copper-impregnated tungsten. Tungsten advantageously combines a very high melting temperature and wear resistance with comparatively good heat conducting properties at a low contact resistance.

The characterized contact tube is particularly suitable for use in a welding torch for plasma-MIG-welding in which high wire speeds are, in view of the high melting rates, inherent to this process used. However, the contact tube may also advantageously be used in welding apparatus for carrying out other gas arc welding processes.

The invention will be described in greater detail with reference to an embodiment shown in the drawing.

DESCRIPTION OF THE PREFERRED EMBODIMENT

The drawing shows a device for carrying out the plasma-MIG-welding process which comprises a welding torch 1 having a housing 3 which is provided with a hood 5 and a nozzle 7 having a plasma aperture 9. An electrode holder 11 carrying a non-consumable electrode 13, for example of tungsten, is placed in the housing 3 so as to be eccentric relative to the plasma aperture 9. By means of a driving and straightening mechanism 17 driven by a motor 15 a welding wire 19 to be supplied is unwound at a controllable speed from a supply reel (not shown), straightened and fed in a substantially straight line axially through the centre of the plasma aperture 9 by a guiding and contact member 21. The welding torch is furthermore provided with a supply duct 23 for the supply of plasma gas, for example argon, and with connections 25 for the supply of a protective gas, for example, a mixture of argon with carbonic acid. The housing 3, the electrode holder 11 and the guiding and contact member 21 are provided with cooling ducts 27, 29 and 31 which communicate with connections 33', 33", 35', 35" and 37', 37" for the supply and removal of cooling water. By means of a terminal 39, the electrode 13 is connected to one of the terminals of a supply source 41 via a high frequency generator 43, while the guiding and contact member 21 is connected to one of the terminals of a second independent supply source 47 by means of a connection terminal 45. A workpiece 49 to be welded is connected to the other terminal of the two supply sources 41 and 47.

The guiding and contact member 21 serves both for guiding the welding wire 19 and for transmitting the current and comprises a holder element 51 having cooling ducts 31, the connection terminal 45 and an aperture 53. By means of a rigid, electrically readily conducting screw connection 55, a contact tube element 57 is secured to the holder 51 and is composed of a coupling member 59 having a bore 61 and a contact element or electrode tip 63 having a bore 65, which contact element is secured to the coupling member 59 by means of a soldered joint 67.

The holder 51 serves in the first place for cooling and is manufactured from a thermally readily conducting material, preferably copper. The current transmission to the welding wire 19 takes place mainly in the contact element 63 which for that purpose is manufactured from a metal having a high melting-point and a high resistance to detrition, preferably tungsten which is resistent to damage by spark formation and by metal particles. The coupling member 59 which is likewise constructed from copper serves in the first place to obtain a simple connection of the contact element 63 with the holder 51 without the necessity of providing screwthread on the contact element of tungsten which is difficult to work. The contact tube 57 may also be manufactured entirely from tungsten, which, however, results in a more difficult connection to the holder 51, higher material costs, as well as a worse cooling of the contact tube. The bore 65 of the control element 63 is only slightly larger than the diameter of the welding wire to be supplied, while the bore 53 of the holder 51 and the bore 61 of the coupling member 59 can be rather wide so that spark formation between the welding wire and the holder or the coupling member does substantially not occur.

Prolonged experiments with a welding torch according to the invention have been carried out in a disturbance-free manner at wire speeds in the order of magnitude of 50 m/min., while the welding process, when using a conventional welding torch with a contact tube of copper and at the same wire speeds, had to be interrupted regularly because the welding wire had jammed.

What is claimed is:

1. In a plasma arc MIG welding torch including a housing having therein a central chamber, and a first duct for a flow of plasma gas from an external source thereof in to said chamber, and a nozzle defining a first outlet aperture of said chamber, the housing further including a second duct for a flow of protective gas from an external source thereof and an outlet aperture generally concentric with and outward of said first outlet aperture, a non-consumable electrode positioned in said chamber with the tip end thereof near and inward of said first outlet aperture, said torch being operable with a source of electrical current, welding wire, means for feeding said wire through said housing chamber and first aperture, and means for electrically conducting said chamber to said electrode, the improvement in combination therewith of a wire guide and contact member comprising a holder element, a contact tube element, and an electrode tip element, all three elements being tubular and positioned coaxially for receiving said welding wire therethrough, the adjacent ends of the holder and contact tube elements being releasably secured together, and their bores providing substantial clearance for passage of said wire therethrough, and adjacent ends of the contact tube and tip element being fixedly secured together, the bore of said tip element providing very small clearance for said wire, the holder element made of very high heat and electrically conductive material, the tip element made at least primarily of tungsten, and torch further comprising means for cooling said holder element, and means for electrically conducting said electrical current source to said holder and thence to the wire.

2. Apparatus according to claim 1 wherein said contact tube element is composed primarily of tungsten.

3. Apparatus according to claim 1 wherein said electrode tip comprises only tungsten.

4. Apparatus according to claim 1 wherein said tip is soldered to said contact tube.

* * * * *

PO-1050
(5/69)

UNITED STATES PATENT OFFICE
CERTIFICATE OF CORRECTION

Patent No. 3,818175　　　　　　　　　Dated　　June 18, 1974

Inventor(s) WILHELMUS GERARDUS ESSERS ET AL

It is certified that error appears in the above-identified patent and that said Letters Patent are hereby corrected as shown below:

Col. 1, line 68, delete "well as"

Col. 4, line 6, "chamber" should be --current--

Signed and sealed this 8th day of October 1974.

(SEAL)
Attest:

McCOY M. GIBSON JR.　　　　　　　　　C. MARSHALL DANN
Attesting Officer　　　　　　　　　　Commissioner of Patents